May 19, 1925.  1,538,257
N. L. OBRECHT
BUFFER FOR AUTOMOBILES
Filed Sept. 22, 1921
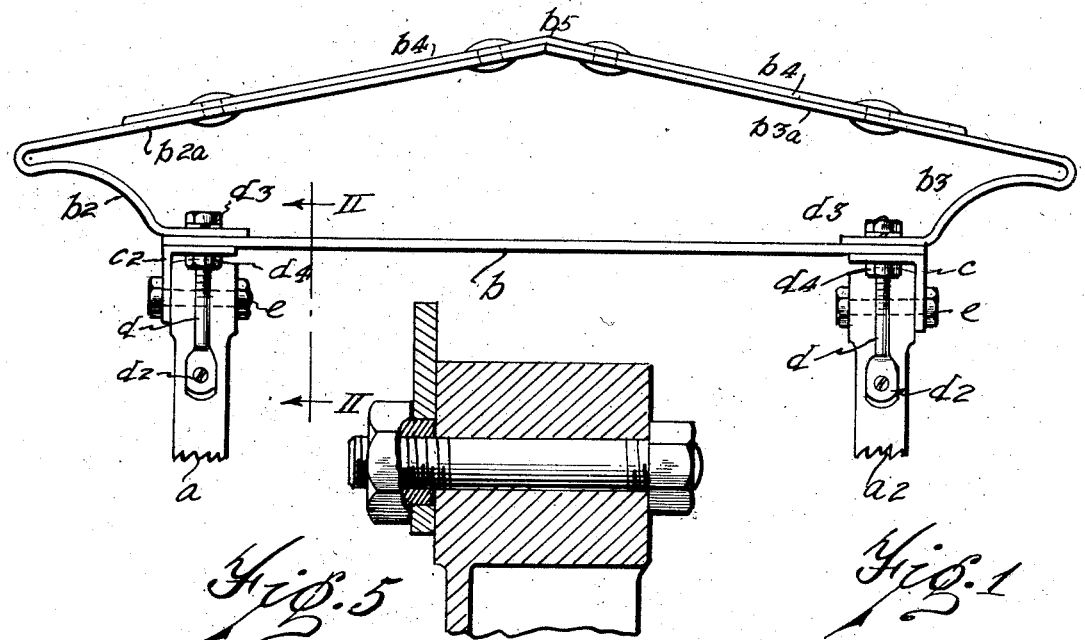
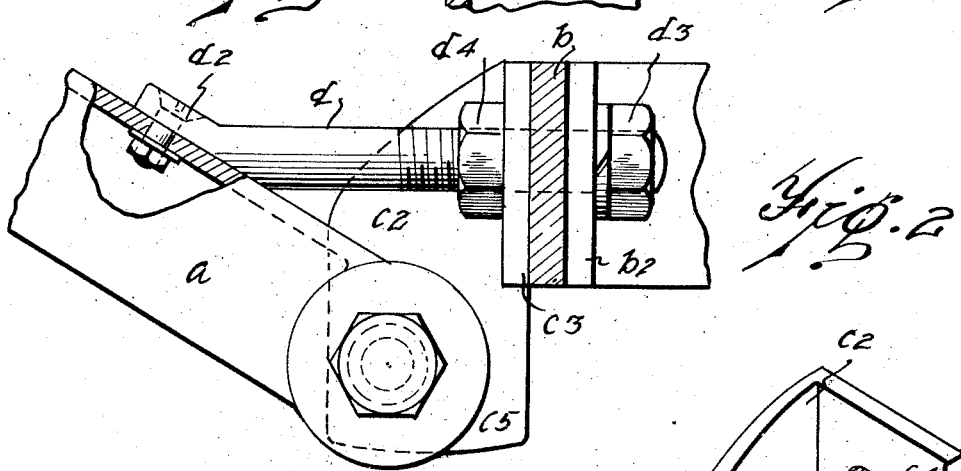
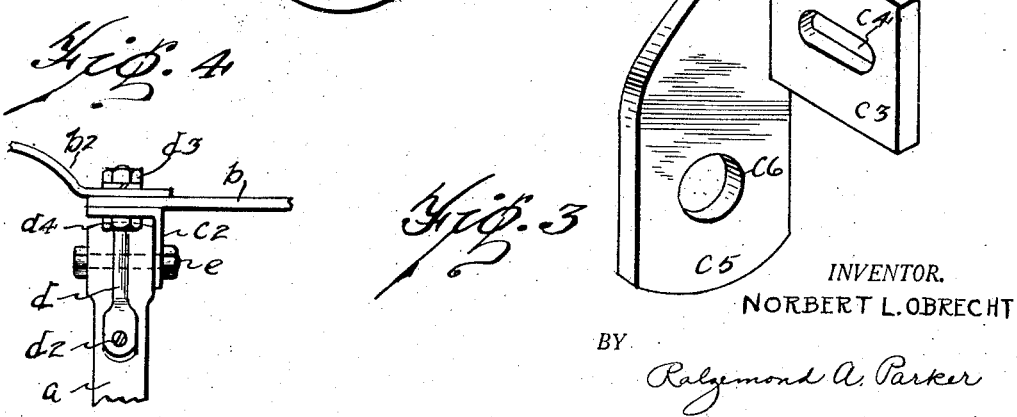
INVENTOR.
NORBERT L. OBRECHT
BY
Ralzemond A. Parker
ATTORNEY.

Patented May 19, 1925.

1,538,257

UNITED STATES PATENT OFFICE.

NORBERT L. OBRECHT, OF MOUNT CLEMENS, MICHIGAN.

BUFFER FOR AUTOMOBILES.

Application filed September 22, 1921. Serial No. 502,331.

*To all whom it may concern:*

Be it known that I, NORBERT L. OBRECHT, a citizen of the United States, residing at Mount Clemens, county of Macomb, State of Michigan, have invented a certain new and useful Improvement in Buffers for Automobiles, and declare the following to be a full, clear, and exact description of the same, such as will enable others skilled in the art to which it pertains to make and use the same, reference being had to the accompanying drawings, which form a part of this specification.

My invention relates to buffers for automobiles, and an object of my improvements is to make a buffer that will be more effective in preventing injury from collisions and will be an improved buffer that shall be more effective in preventing injuries from collisions and one convenient to assemble firmly in place.

My invention is shown in the accompanying drawings, in which:

Figure 1 is a plan view of an apparatus embodying my invention and so much of an automobile chassis as is necessary to illustrate its connection therewith.

Fig. 2 is a detailed section on the line II—II, Fig. 1.

Fig. 3 is a perspective view of one of the attaching pieces.

Fig. 4 is a detailed plan view showing a modified form of construction.

Figure 5 is a detailed section showing the construction and engagement of the bolt $e$.

$a$, $a^2$ represent the ends of the side pieces of the chassis. $b$ is a strip of elastic steel extending between the ends of the side pieces $a$, $a^2$ and secured thereto as hereinafter described. $b^2$ and $b^3$ are similarly shaped pieces of steel located upon opposite sides of the chassis, one being secured to the side piece $a$ and the other to the side piece $a^2$, these parts being of the same construction, only one will be described. This piece $b^2$ is secured at one end to the end of the side piece $a$, its inner surface engaging against the surface of the strip $b$. The part then bends forward and laterally outward in a curved form as shown in Fig. 1 and then bends sharply back and inward forming a part $b^2a$ that converges outward or forward from the automobile and ends at the center line of the frame. The part $b^3$ extends in a part $b^3a$ corresponding to the part $b^2a$, the ends of the part $b^2a$ and $b^3a$ coming together at the center line as shown. $b^4$ is a strip of steel lying against the outer surface of the parts $b^2a$ and $b^3a$ and securely riveted to said parts to secure the same together.

$c$, $c^2$ are pieces of angle iron cut out as illustrated in Fig. 3 to form the lateral extending part $c^3$ and the vertically extending part $c^5$. $c^4$ is a laterally elongated aperture through the part $c^3$; and $c^6$ is a circular aperture through the part $c^5$. $d$, $d$ are bolts, one of which is secured at one end to each of the side pieces $a$, $a^2$ at $d^2$ at the top of said side piece, and extend forward through the aperture $c^4$ and holes formed through the ends of the steel strips $b$, $b^2$, and $b^3$. $d^3$ and $d^4$ are nuts upon the bolts $d$ which bind the strips $b$, $b^2$, and $b^3$ to the bolts $d$, $d$ and subsequently to the side pieces $a$, $a^2$ of the frame.

$e$ is a bolt passing through the eye at the end of each of the side pieces $a$, $a^2$ and through the aperture $c^6$ in an angle piece $c$, $c^2$. The position of the buffer as to the plane in which it is located may be regulated by moving the nuts $d^3$, $d^4$ and turning the securing piece $c$ or $c^2$ about the bolt $e$.

On turning to Fig. 2 it will be observed that the bolts $d$ engage the downwardly-sloping surface of the side piece and are directly in line of any thrust that may come upon the buffer so that they act as an efficient brace to receive all such forces.

The part $c$, $c^2$ may be made out of commercial angle iron and need but little shaping to contact them for immediate use. If desired, instead of putting the parts $c$, $c^2$ with vertical flanges $cc^5$ on the outside of the side pieces, they may be placed on the inside as illustrated in Fig. 4.

The angle at which the two forward parts $b^2a$, $b^3a$ and their engaging strip $b^4$ extend, together with their flexibly supported outer ends, provides a very flexible form of construction affording a suitable range of travel for the central portion and, in many cases, securing a slanting instead of a direct blow.

What I claim is:

1. The combination with the side pieces of a chassis, of a resilient frame work, an angle iron secured with one flange along the side of the end of each of the side pieces and a second flange extending laterally from the first flange, a bolt passing through an aperture in the first-named flange and through an eye in a side piece adapted to secure said angle iron to said side piece and a part engaging the upper surface of each of said side pieces and extending forward parallel to said side piece and engaging through an aperture in the laterally-extending flange of each of said angle irons, said bolt being provided with engaging nuts for the purpose described.

2. The combination with the side pieces of a chassis, a flexible cross bar $b$, a flexible frame $b^2, b^3, b^4$, angle pieces $c, c^2$ and bolts $d, d$ extending through a flange of said angle piece and through the ends of the bar $b, b^2, b^3$ and being secured to said bars at one end and to a side piece at the other end and a bolt $e$ extending through an eye in each of said side pieces and through an aperture in a flange of said angle iron, substantially as and for the purpose described.

3. In an apparatus of the kind described, a resilient frame consisting of the flexible cross piece $b$, similar strips $b^3$ and $b^3$ secured at opposite ends of said cross piece extending outwardly and forwardly and bending inwardly and extending forwardly to meet at the center line of the chassis and a flexible piece $b^4$ secured to the parts $b^2$ and $b^3$ binding said forwardly and inwardly extending portions of said parts together.

4. An end bumper for vehicles comprising an angular spring metal side member for each side of the vehicle attachable at one end thereto and extending forwardly and outwardly thereof and then turned inwardly to meet the opposite side member at a point substantially midway the width of the vehicle and forward thereof, a front spring metal member angularly shaped to fit over the meeting angle of the inwardly extending portion of the side members and secured to said side members so that the front member and side members comprise a unitary resilient structure.

In testimony whereof I sign this specification.

NORBERT L. OBRECHT.